(12) United States Patent
Buer et al.

(10) Patent No.: US 8,396,496 B2
(45) Date of Patent: Mar. 12, 2013

(54) SYSTEM AND METHOD FOR THERMAL MANAGEMENT OF A TRANSCEIVER

(75) Inventors: Kenneth V. Buer, Gilbert, AZ (US); Josh Tor, Gilbert, AZ (US); Michael Noji, Gilbert, AZ (US)

(73) Assignee: ViaSat, Inc., Carlsbad, CA (US)

( * ) Notice: Subject to any disclaimer, the term of this patent is extended or adjusted under 35 U.S.C. 154(b) by 185 days.

(21) Appl. No.: 12/781,611

(22) Filed: May 17, 2010

(65) Prior Publication Data
US 2011/0280288 A1 Nov. 17, 2011

(51) Int. Cl.
*H04B 15/00* (2006.01)
*H04B 7/00* (2006.01)

(52) U.S. Cl. .................................. 455/504; 455/522

(58) Field of Classification Search ............. 455/67.11, 455/117, 68, 129, 522, 73, 121, 127.1, 232.1, 455/501, 504, 505; 370/338, 318, 319, 321; 714/751
See application file for complete search history.

(56) References Cited

U.S. PATENT DOCUMENTS

| | | | | |
|---|---|---|---|---|
| 4,939,786 A | * | 7/1990 | McCallum et al. | 455/67.11 |
| 6,215,358 B1 | * | 4/2001 | Hon et al. | 330/289 |
| 2004/0015765 A1 | * | 1/2004 | Cooper et al. | 714/750 |
| 2008/0238757 A1 | * | 10/2008 | Lin et al. | 342/22 |
| 2010/0091747 A1 | * | 4/2010 | Dorsey et al. | 370/338 |

OTHER PUBLICATIONS

Updated Filing Receipt, U.S. Appl. No. 13/109,838, dated Jul. 21, 2011.
Office Action dated Jan. 30, 2012 in U.S. Appl. No. 13/109,838.
USPTO; Advisory Action dated Aug. 29, 2012 in U.S. Appl. No. 13/109,838.
USPTO; Final Office Action dated Jun. 6, 2012 in U.S. Appl. No. 13/109,838.

* cited by examiner

*Primary Examiner* — Nay A Maung
*Assistant Examiner* — Cindy Trandai
(74) *Attorney, Agent, or Firm* — Snell & Wilmer L.L.P.

(57) ABSTRACT

In accordance with an exemplary embodiment, a system comprising a transceiver, a sensor and a controller is provided. The sensor is coupled to an electrical component in the transceiver and is configured to measure a thermal load on the electrical component. The controller is configured with a predetermined threshold, and is configured to reduce the voltage and current bias point, in the power amplifier, in response to the thermal load measurement being greater than the predetermined threshold. The system provides an inexpensive solution to the problem of shedding thermal load in transceiver systems and can be incorporated into new systems or adapted to legacy systems.

12 Claims, 3 Drawing Sheets

SYSTEM AND METHOD FOR THERMAL
MANAGEMENT OF A TRANSCEIVER

FIELD OF THE INVENTION

The present invention generally relates to systems, methods, and devices for reducing thermal load on an electronic component, and more particularly, systems, methods, and devices for reducing power consumption to reduce the thermal load on a transceiver system.

BACKGROUND OF THE INVENTION

Transceiver systems are required to run in various environments where they are subjected to thermal loads, which have the potential to damage electronic components. For example, during high transmission load periods the temperature of various electronic components of a transceiver system may exceed a predetermined threshold for limited amounts of time. Similarly, during hot day operating conditions in an environment such as Phoenix, Ariz. or Needles, Calif. the temperature of various electronic components of a transceiver system may exceed a predetermined threshold for limited amounts of time, such as 10 to 20 hours per year. In order to avoid damaging the transceiver, the system is typically shutdown and allowed to cool. The shutdown results in transmissions between the system and signal sources being lost. As a result users of the system must wait for the transceiver to cool, restart and re-connect to the source before they are able to receive and transmit data. This delay is undesirable.

As such, components in transceiver systems may be designed to withstand thermal loads by employing expensive heat tolerant materials or by making use of heat dissipating mechanisms (e.g. fans) and structures (e.g. cooling fins). However, the heat dissipating mechanisms can be unreliable and greatly affect the overall reliability of the transceiver system. Further, heat dissipating structures are expensive to design and manufacture.

Thus, it is desirable to have an inexpensive system, method and apparatus for reducing the thermal load in a transceiver system without shutting down the transceiver.

SUMMARY OF THE INVENTION

In an exemplary embodiment a transceiver system comprises a controller, a sensor and an electrical component. The sensor is operatively coupled to the controller, such that the controller is configured to receive an input from the sensor. The electrical component is operatively coupled to the sensor. The transceiver system is coupled to the electrical component and the controller, wherein the controller is configured to modify an operating parameter of the transceiver in response to the input from the sensor. In various embodiments, the transceiver system is a high frequency transceiver system such as a K-band transceiver or a Ka-band transceiver.

In accordance with an exemplary method, the controller of a transceiver system is configured to monitor a thermal load of an electrical component of a transceiver system. Where the thermal load exceeds a predetermined threshold, the voltage and current bias point of an amplifier are modified to reduce the thermal load on the transceiver system. In response to the modification of the voltage and current bias point, an error checking system is initiated to validate the data transmitted and received by the transceiver system.

In an exemplary embodiment, a system comprising a transceiver, a sensor and a controller is provided. The transceiver comprises an electrical component and a power amplifier. The sensor is coupled to the electrical component and configured to measure a thermal load on the electrical component. The controller is coupled to the sensor and the power amplifier. The controller is configured with a predetermined threshold. The controller is also configured to receive the thermal load measurement from the sensor. The controller may reduce a voltage and current bias point in, for example, the power amplifier in response to the thermal load measurement being greater than the predetermined threshold.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

While various exemplary embodiments are described herein in sufficient detail to enable those skilled in the art to practice the invention, it should be understood that other embodiments may be realized and that logical material, electrical, and mechanical changes may be made without departing from the spirit and scope of the invention. Thus, the following detailed description is presented for purposes of illustration only. Furthermore, references to components or devices may be used interchangeably.

In an exemplary embodiment, a system for the thermal management of a transceiver comprises a controller and a sensor. In an exemplary embodiment, the controller and the sensor are each operatively coupled to a transceiver. The sensor and the controller may also be operatively coupled to one another. The sensor may be configured to measure a temperature or any other parameter indicative of a thermal load. Further, the sensor may be configured to communicate the parameter to the controller. The controller may be configured to modify an operating parameter of the transceiver to modify a thermal load in the transceiver. Thus, in an exemplary embodiment, systems, methods, and devices are provided for managing the thermal load in a transceiver by modifying the duty cycle of the transceiver.

In an exemplary embodiment, the thermal management system may be implemented in a new transceiver system or adapted to control the thermal load of a legacy transceiver system. Moreover, while the thermal management system is discussed in terms of a transceiver system, various exemplary thermal management systems may be employed in other systems where analog performance can be incrementally sacrificed to reduce power consumption, including for example, radar systems.

Figure 1:
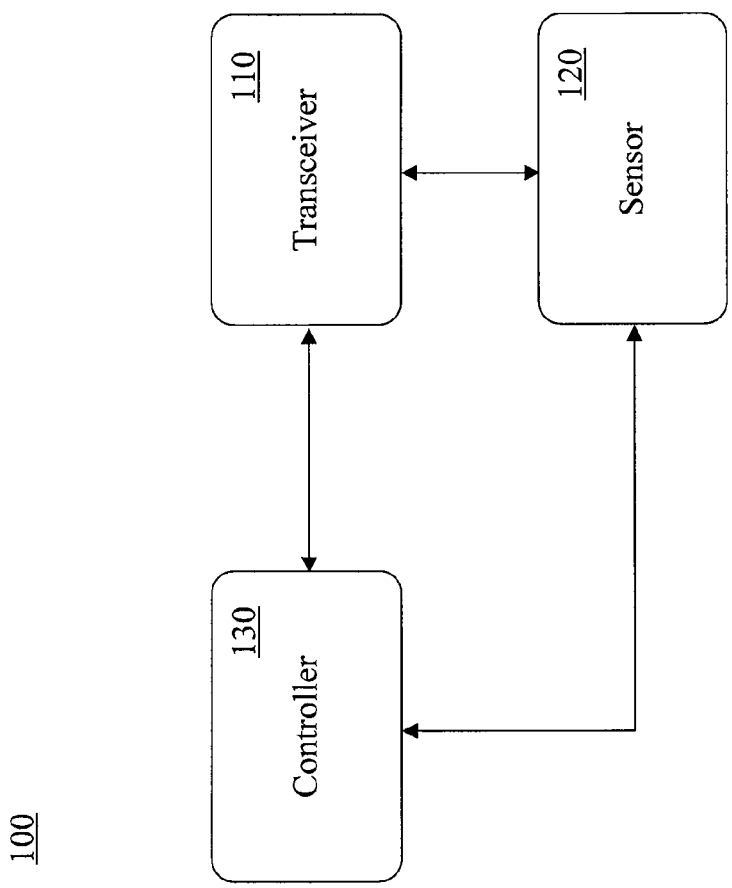
FIG. 1 is a block diagram of exemplary components of a transceiver system.

With reference now to FIG. 1, in accordance with an exemplary embodiment, a system 100 comprises a transceiver 110, a sensor 120, and a controller 130. Sensor 120 may be operatively coupled to transceiver 110. Sensor 120 may also be operatively coupled to controller 130. Similarly, controller 130 may be operatively coupled to transceiver 110.

In an exemplary embodiment, transceiver 110 may be a high frequency transceiver. For example, transceiver 110 may be a Ka-band transceiver configured to transmit and/or receive Ka-band signals from a satellite. Transceiver 110 may also communicate signals in the Ku, K, or Q-band. For example, transceiver 110 may comprise a transceiver such as US Monolithics transceiver model number USM-TXR-KA01-F-01-110. Furthermore, transceiver 110 may comprise any suitable transceiver. Moreover, transceiver 110 may be configured to transmit over any signal frequency and/or band.

In an exemplary embodiment, sensor 120 may be a thermal load sensor, such as for example, a thermocouple. Sensor 120 may be configured to measure the temperature of transceiver 110. Sensor 120 may also be configured to measure a thermal load of transceiver 110. Similarly, sensor 120 may be configured to measure a temperature or other thermal load of an electrical component with a thermal load that is proportional to the thermal load of transceiver 110. Furthermore, sensor 120 may comprise any suitable thermal load sensor, including for example, a temperature sensor, a thermal stress sensor, a thermal strain sensor, an infrared sensor, a thermistor, a diode based circuit with a known temperature profile and/or the like.

In an exemplary embodiment, controller 130 may be any hardware, software, or hardware-software system. Controller 130 may be installed with transceiver 110 or may be installed at a location remote to transceiver 110. Controller 130 may be configured to receive an input from or monitor sensor 120. Controller 130 may also be configured to transmit data to transceiver 110. For example, in an exemplary embodiment, controller 130 may be configured to modify the operating parameters of transceiver 110 in response to an input from sensor 120. For example, controller 130 may modify a voltage and/or current bias point, in response to an input from sensor 120 indicating a thermal load that is above a predetermined level.

Figure 2:
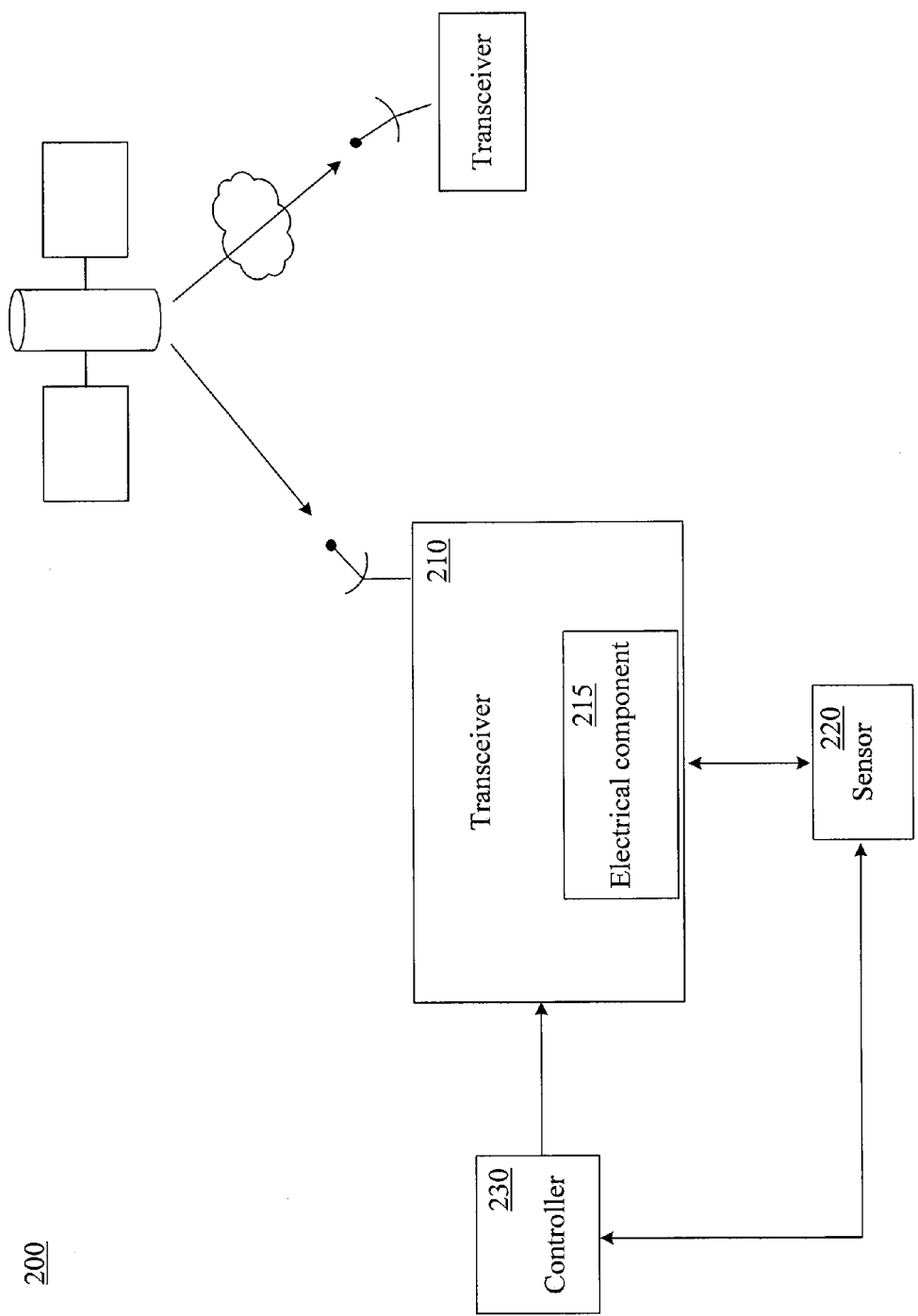
FIG. 2 is a block diagram of an exemplary embodiment of a transceiver system in communication with a signal source.

In an exemplary embodiment and with reference to FIG. 2, a system 200 may comprise a transceiver 210, a sensor 220 and a controller 230. Transceiver 210 may comprise an electrical component 215. Sensor 220 may be coupled to transceiver 210 at electrical component 215. Sensor 220 may also be coupled to controller 230. Transceiver 210 may also be coupled to controller 230.

In an exemplary embodiment, electrical component 215 may be any electrical component contained within transceiver 210. For example, electrical component 215 may be a power amplifier, a microprocessor, a digital signal processor, a mixer, a filter, a local oscillator.

In an exemplary embodiment, sensor 220 is configured to monitor the thermal load of transceiver 210. Sensor 220 may monitor the thermal load at electrical component 215. Typically, a power amplifier is the hottest component in transceiver 210. However, given the various installation locations and/or configurations of power amplifiers, the opportunity to measure the thermal load on the power amplifier directly may be less directly available. Thus, sensor 220 may be coupled to any other electrical component 215. In an exemplary embodiment, the properties of electrical component 215 are known. The thermal load on electrical component 215 can be measured and used to determine the thermal load on the power amplifier or another component. Similarly, the thermal load on electrical component 215 may be directly proportional to a predetermined threshold amount. As such, when the thermal load measured at electrical component 215 reaches the predetermined threshold, controller 230 may send a command to transceiver 210 to modify an operating parameter of transceiver 210.

In accordance with an exemplary embodiment, the predetermined threshold may be an operating temperature that provides undesirable operating conditions for a component of transceiver 210, such as for example, approximately 80° C. to 100° C. Similarly, the predetermined threshold may be a junction temperature, such as for example, approximately 115° C. to 135° C. for the silicon die junction and/or approximately 135° C. to 165° C. for the gallium arsenide die junction. The predetermined threshold may be defined in terms of any thermal load, including for example, a point temperature (e.g. thermocouple reading), a temperature distribution (e.g. infrared reading), thermal stress, thermal strain, and the like. Moreover, the predetermined threshold can be any value that is established to protect components contained within transceiver 210.

In an exemplary embodiment, transceiver 210 is configured to operate over a range of conditions that may affect signal quality from a signal source. For example, transceiver 210 may be configured to operate under conditions, which result in degraded signal conditions. For example, a signal may be degraded when environmental conditions are present, including for example, cloudy conditions, rainy conditions, dusty conditions, and the like. Similarly, transceiver 210 may be configured to operate at lower than optimal levels in response to a thermal load. In response to the thermal load, the operating parameters of transceiver 210 may be modified, which result in signals being transmitted or received under conditions similar to those conditions that are present during adverse environmental conditions. In order to operate under these various conditions, the transceiver may employ various signal conditioning hardware and software. For example, the transceiver may employ adaptive modulation rates, forward error correction, automatic repeat request error checking, and the like. Under these operating conditions, transceiver 210 may be configured to properly receive and transmit data where the signal quality is reduced.

In an exemplary embodiment, transceiver 210 may be configured to properly transmit and receive data using various signal conditioning hardware and software under a modified operating scheme to shed a thermal load. For example, transceiver 210 may receive an input from controller 230 to modify an operating parameter. An input from controller 230 may be provided in response to a thermal load being above a predetermined level at electrical component 215 as measured by sensor 220. Similarly, the thermal load at electrical component 215 may be proportional to the thermal load on another component in transceiver 210. In response to the thermal load being detected by sensor 220 or controller 230, transceiver 210 may be configured to reduce the power consumed by transceiver 210.

As discussed previously, the power amplifier is typically the hottest component in transceiver 210. In an exemplary embodiment, controller 230 reduces the voltage and/or current bias point of the power amplifier. The reduction in voltage and/or current bias point reduces the power consumed by the power amplifier and reduces thermal load on transceiver 210. Similarly, controller 230 may be configured to reduce the voltage and/or current bias point of any electrical component 215 to reduce the power consumed by electrical component 215. This reduction in voltage and/or current bias point reduces the power consumed by electronic component 215 and the corresponding thermal load. As such, controller 230 may be configured to monitor the thermal load of any component in transceiver 210. Controller 230 may reduce the voltage and/or current bias point of the component or a related component. The reduction in current and/or voltage bias point reduces the thermal load on the component preventing an undesirable operating condition. Further, the reduction in voltage and/or current bias point reduces the thermal load on transceiver 210.

Further, reducing the voltage and/or current bias point of electrical component 215 provides for reduced transceiver performance similar to the performance conditions present during poor weather conditions as discussed above. As such, by reducing the voltage and/or current bias of electrical component 215, transceiver 210 is able to continue to operate under acceptable parameters while shedding thermal load.

In an exemplary embodiment, controller 230 may be configured to modify the operating parameters of transceiver 210 by reducing the current and/or voltage bias point of the electrical component 215 in response to a thermal load detected by sensor 220. Controller 230 may be configured to reduce the voltage and/or current bias point in a tiered fashion to reduce the thermal load on transceiver 210. For example, controller 230 may be configured with a four tier-operating scheme, which modifies the operating condition of transceiver 210 in response to the thermal load detecting by sensor 220 indicating an undesirable operating condition at the power amplifier. In an exemplary embodiment, controller 230 may be configured with four modes, including: (1) Mode 1 may provide a 100% voltage and/or current bias point to the power amplifier; (2) Mode 2 may provide an 85% voltage and/or current bias point to the power amplifier; (3) Mode 3 may provide an 70% voltage and/or current bias point to the power amplifier; and (4) Mode 4 may provide an 55% voltage and/or current bias point to the power amplifier. Over the four tier-operating scheme, transceiver 210 may be subject to a loss of signal strength of between approximately 0.5 decibel and 6 decibels. As such, each 15% reduction of the voltage and/or current bias point from 100% may account for approximately a 0.5 decibel to a 1.0 decibel loss in signal strength. This loss resulting from the reduction of voltage and/or current bias point to shed thermal load may be compensated for with the signal fade algorithms currently in place to compensate for losses due to environmental conditions. Moreover, controller 230 may be configured with any number of modes to provide from the reduction of thermal load. Similarly, each mode may be configured with any reduction in voltage and/or current bias point to provide for a reduction of the thermal load.

In an exemplary embodiment, controller 230 may be configured to reduce the voltage and/or current bias point to reduce the thermal load on transceiver 210. For example, controller 230 may be configured with an analog control loop. The controller may gradually increase or reduce the voltage and/or current bias point of electrical component 215 continuously over a period of time based on the thermal load being monitored. During the period of time that the voltage and/or current bias is reduced sensor 220 may continuously communicate the thermal load on transceiver 210 to controller 230. Controller 230 may evaluate the thermal load continuously or at intervals to determine whether the thermal load on transceiver 210 is below a predetermined threshold. Controller 230 may hold the voltage and/or current bias point at a level corresponding to the point where the thermal load on transceiver 210 is below the predetermined threshold. Further, controller 230 may continue to monitor the thermal load on transceiver 210 and gradually increase the voltage and/or current bias point as the thermal load decreases.

In accordance with an exemplary embodiment, the thermal time constant associated with each 15% reduction in voltage and/or current bias point may be less than 15 minutes. Further, the system may be designed with a hysteresis. The hysteresis provides a time delay for the increase in the voltage and/or current bias point. This hysteresis ensures that there is sufficient time to allow the thermal load on transceiver 210 to dissipate before restoring a higher operating mode. For example, controller 230 may be configured with a hysteresis of approximately less than 1 to 5 minutes between each transition that restores a percentage of the voltage and/or current bias point from each lower operating mode. This avoids a lock up or substantially continuous switching condition where the voltage and/or current bias point is continually adjusted to shed a thermal load, when the thermal load is close to the predetermined threshold after a cooling period. Moreover, controller 230 may be configured with any suitable level of hysteresis to avoid a lock up or substantially continuous switching condition.

Figure 3:
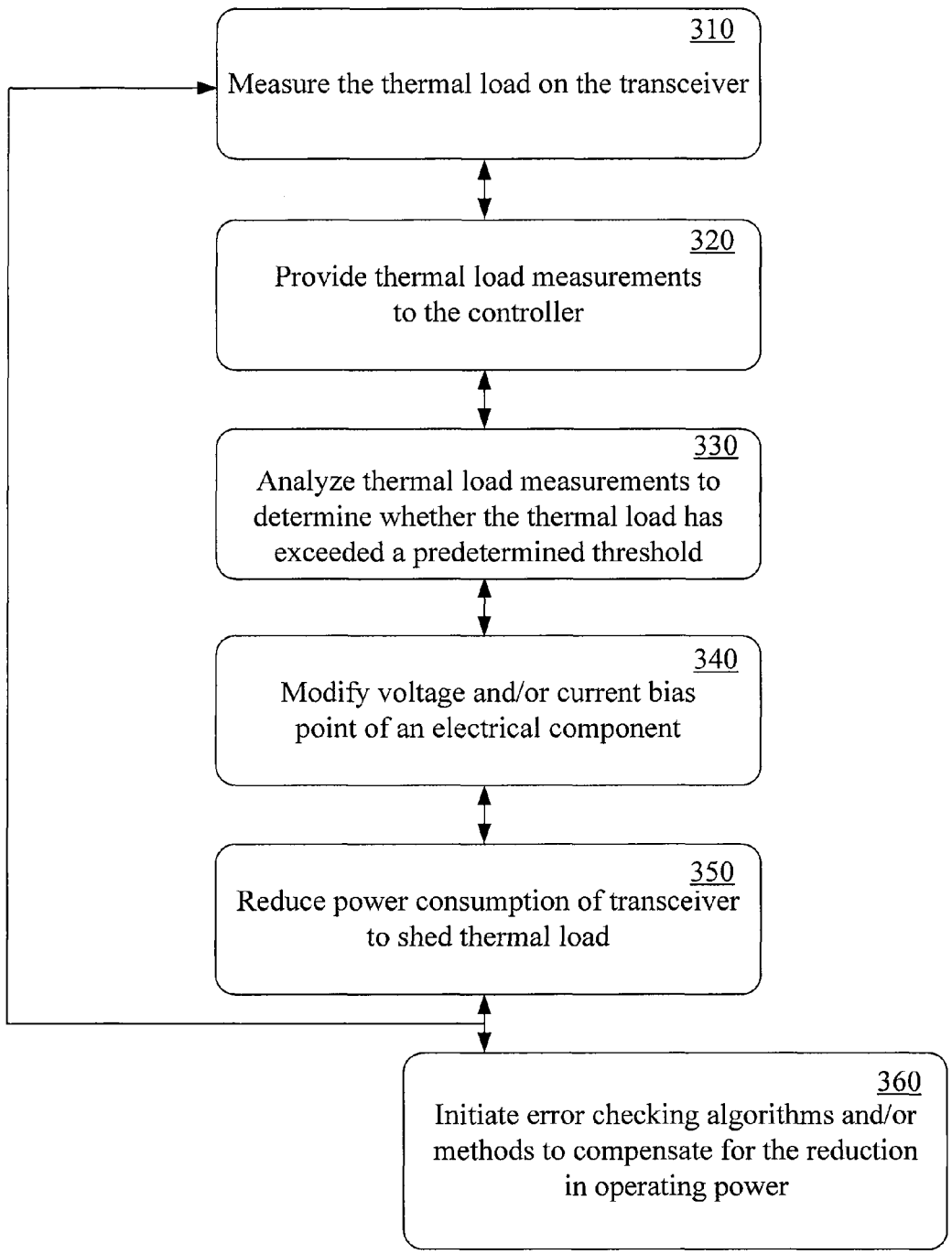
FIG. 3 is a block diagram of an exemplary method for reducing the thermal load of a transceiver system.

With reference to FIG. 3 and in accordance with an exemplary embodiment, a method 300 for managing the thermal load in a transceiver system is provided. The thermal management system for a transceiver may be configured to measure the thermal load on a transceiver using a sensor (Step 310). The sensor may transmit thermal load measurements and/or data to a controller (Step 320). The controller may then analyze the thermal load measurements and/or data to determine whether the thermal load exceeds a predetermined threshold (Step 330). Where the predetermined threshold is exceeded, the controller may communicate modified operating parameters, (such as for example, a percentage reduction of the voltage and/or current bias point) to a power amplifier (Step 340). Thereafter, the transceiver may automatically reduce its power consumption to shed thermal load (Step 350). The controller may continue to monitor the thermal load to determine whether the thermal load continues to exceed the predetermined threshold (Step 320) and modify the operating parameters of an electrical component in the transceiver to shed thermal load until the thermal load is below the predetermined threshold (Steps 330 to Step 350). The transceiver may also automatically initiate enhanced error checking algorithms and/or methods to verify the data received during the reduced operating mode is accurate (Step 360) in response to modifying the operating parameters of the electrical component.

When a phrase similar to "at least one of A, B, or C" or "at least one of A, B, and C" is used in the claims, Applicants intend the phrase to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:
1. A digital data transceiver system comprising:
a controller;
a sensor operatively coupled to the controller, wherein the controller is configured to receive an input from the sensor;

an electrical component operatively coupled to the sensor, wherein the input represents a thermal load on the electrical component; and a transceiver coupled to the controller, wherein the controller is configured to modify an operating parameter of the transceiver in response to the input from the sensor, wherein the input is based on the thermal load, wherein the controller comprises a predetermined threshold and wherein the predetermined threshold corresponds to an unsafe level of thermal load, wherein modifying the operating parameter occurs when the thermal load exceeds the predetermined threshold, wherein modifying the operating parameter causes the transceiver to operate in a reduced power mode; and wherein any reduced power transmission due to modification of the operating parameter is compensated for using signal fade algorithms comprising a validation system configured to adapt at least one of (i) forward error correction coding and (ii) modulation rates to maintain an acceptable signal to noise ratio despite the reduced power transmission from the transceiver.

2. The system of claim 1, wherein the electrical component is a component other than a power amplifier, wherein the controller is configured to determine a thermal load on the power amplifier based on the input from the sensor.

3. The system of claim 1, wherein the input is at least one of a temperature, a thermal strain, and a thermal stress.

4. The system of claim 1, wherein the validation system is configured to validate a signal received by the transceiver.

5. The system of claim 1, wherein the transceiver is at least one of a K-band and a Ka-band transceiver.

6. A method for thermal management in a digital data transmitter system, the method comprising:

monitoring a thermal load of an electrical component of a transmitter system;

determining whether the thermal load exceeds a predetermined threshold;

modifying a voltage bias point and a current bias point of an amplifier, when the thermal load exceeds the predetermined threshold, to reduce power transmission of the transmitter system; and initiating an error checking system, wherein any reduced power transmission due to modification of the voltage bias point and current bias point of the amplifier is compensated for using signal fade algorithms configured to adapt at least one of (i) forward error correction coding and (ii) modulation rates to maintain an acceptable signal to noise ratio despite the reduced power transmission from the transmitter system.

7. The method of claim 6, further comprising, modifying the voltage and current bias point of the amplifier, in response to the thermal load being below the predetermined threshold.

8. The method of claim 7, wherein the modifying in response to the thermal load being below the predetermined threshold is delayed to avoid a substantially continuous switching condition.

9. The method of claim 6, wherein the transceiver system is at least one of a K-band and a Ka-band transmitter system.

10. A digital data transmitter system comprising:

a transmitter, the transmitter comprising an electrical component and a power amplifier;

a sensor, coupled to the electrical component and configured to measure a thermal load on the electrical component; and a controller, configured with a predetermined threshold and coupled to the sensor and the power amplifier, wherein the controller is configured to receive the thermal load measurement from the sensor, wherein the controller is configured to reduce a voltage bias point and current bias point in the power amplifier in response to the thermal load measurement being greater than the predetermined threshold in order to reduce power transmission of the transmitter; and wherein any reduced power transmission, due to reducing the voltage bias point and the current bias point in the power amplifier, is compensated for by using signal fade algorithms configured to adapt at least one of (i) modulation rates and (ii) forward error correction coding to maintain an acceptable signal to noise ratio despite the reduced power transmission from the transmitter.

11. The system of claim 10, wherein the controller is configured to increase a voltage and current bias point in the power amplifier in response to the thermal load measurement being less than the predetermined threshold.

12. The system of claim 10, wherein the thermal load is at least one of a temperature, a thermal stress, and a thermal strain.

* * * * *